US012379242B2

(12) United States Patent
Xiao et al.

(10) Patent No.: US 12,379,242 B2
(45) Date of Patent: Aug. 5, 2025

(54) SHIP WEIGHING SYSTEM AND SHIP WEIGHING METHOD (71) Applicant: JINJING ANIMAL DIGITAL TECHNOLOGY (CHONGQING) CO., LTD., Chongqing (CN)

(72) Inventors: Ning Xiao, Chongqing (CN); Haizhong Wu, Chongqing (CN); Zefang Sang, Chongqing (CN); Chun Luo, Chongqing (CN)

(73) Assignee: JINJING ANIMAL DIGITAL TECHNOLOGY (CHONGQING) CO., LTD, Chongqing (CN)

( * ) Notice: Subject to any disclaimer, the term of this patent is extended or adjusted under 35 U.S.C. 154(b) by 393 days.

(21) Appl. No.: 18/153,338

(22) Filed: Jan. 11, 2023

(65) Prior Publication Data

US 2023/0160741 A1   May 25, 2023

Related U.S. Application Data (63) Continuation of application No. PCT/CN2021/131965, filed on Nov. 22, 2021.

(30) Foreign Application Priority Data

Sep. 26, 2021   (CN) .......................... 202111130683.9

(51) Int. Cl.
*G01G 23/37* (2006.01)
*G01F 23/00* (2022.01)
(Continued)

(52) U.S. Cl.
CPC ......... *G01G 23/37* (2013.01); *G01F 23/0007* (2013.01); *G01G 5/00* (2013.01); *G01G 19/00* (2013.01); *G01G 23/365* (2013.01)

(58) Field of Classification Search
CPC ..... G01F 23/0007; G01F 23/804; G01G 5/00; G01G 19/00; G01G 23/365; G01G 23/37
See application file for complete search history.

(56) References Cited

U.S. PATENT DOCUMENTS

| 4,347,574 A | * | 8/1982 | Parsons | G06Q 30/04 |
| | | | | 177/25.14 |
| 5,547,327 A | * | 8/1996 | Bachalo | B63B 39/12 |
| | | | | 414/137.1 |

(Continued)

FOREIGN PATENT DOCUMENTS

| CN | 204674795 U | * | 9/2015 | |
| CN | 107458553 A | * | 12/2017 | ............. B63B 39/12 |

(Continued)

OTHER PUBLICATIONS

International Search Report issued in corresponding International application No. PCT/CN2021/131965, mailed May 26, 2022.

(Continued)

*Primary Examiner* — Natalie Huls (57) ABSTRACT

A ship weighing system and a weighing method thereof include a collection module, a computing server, a wireless router, a display control terminal, and a network switch, which are installed in the ship. The collection module synchronously collects water level data of a stern and trim angle data of a front portion, a middle portion, and a rear portion of the ship. The computing server respectively calculates, based on the water level data collected by the collection module, an accumulated volume of the ship below a slice section parallel to a bottom plane of the ship corresponding to the water level data and a volume of a trim wedge formed by the slice section and an actual horizontal plane. The computing server combines results and corrects (Continued)

a volume of a vertical arch wedge in the middle portion of the ship to obtain a displacement volume of the ship.

12 Claims, 5 Drawing Sheets

(51) Int. Cl.
    *G01G 5/00*     (2006.01)
    *G01G 19/00*     (2006.01)
    *G01G 23/365*     (2006.01)

(56) References Cited

U.S. PATENT DOCUMENTS

| | | | |
|---|---|---|---|
| 6,836,746 B2 * | 12/2004 | Coder | B63B 39/12 |
| | | | 414/137.1 |
| 2009/0112510 A1 | 4/2009 | Crane et al. | |
| 2020/0263974 A1 * | 8/2020 | Ostridge | G01B 11/002 |

FOREIGN PATENT DOCUMENTS

| | | | | |
|---|---|---|---|---|
| CN | 107914837 A | | 4/2018 | |
| CN | 108388737 A | | 8/2018 | |
| CN | 111008614 A | | 4/2020 | |
| CN | 113247197 A | | 8/2021 | |
| CN | 116127722 A | * | 5/2023 | B63B 39/12 |

OTHER PUBLICATIONS

Written Opinion of the International Searching Authority for No. PCT/CN2021/131965, mailed May 26, 2022.

* cited by examiner

SHIP WEIGHING SYSTEM AND SHIP WEIGHING METHOD

TECHNICAL FIELD

The present disclosure relates to a technical field of electronic weighing of ships, and in particular to a ship weighing system based on synchronous measurement of water levels and angles of a ship and a ship weighing method.

BACKGROUND

The current national standard "SN/T 3023.2-2012 Import and Export Commodity Weight Identification Regulations" stipulates a calculating method of a displacement volume of a ship. In the calculating method, draft values of six sides of the ship are visually read one by one, and the displacement volume of the ship is further calculated according to a ship's hydrostatic chart, which is regarded as a key step in calculation of a weight of the ship.

However, there are deficiencies in conventional calculation methods that affect measurement accuracy in actual production activities. Firstly, sea conditions at most terminals are difficult to meet requirements of the measurement environment specified by the national standard, which makes the ship always in an unstable state in the water. Further, a frequency and an amplitude of waves around the ship are irregular, and the draft values of the six sides of the ship are corresponding to six different tilt states of the ship, resulting in measurement errors and uncertainty of deviation direction of the measurement errors. Secondly, a minimum unit of a water scale is generally 20 cm, and when a surveyor visually estimates a scale of the water scale according to a distance from a scale line above a water surface, and a reasonable error is 10-20% of the minimum unit, i.e. 2-4 cm, resulting in a direct observation error and uncertainty of deviation direction of the direct observation error. The measurement errors are further increased according to experience of the surveyor, observation locations, wind, and wave conditions.

SUMMARY

In view of this, a purpose of the present disclosure is to provides a ship weighing system based on synchronous measurement of water levels and angles of a ship and a ship weighing method thereof, which solve problems in the prior art that measurement errors of scales of water scales are relatively large due to scales of water scales are obtained one by one through visually reading or an electronic measuring equipment, which is lack of reading accuracy and is caused by unsynchronized reading time.

To achieve the above purpose, the present disclosure provides the ship weighing system based on synchronous measurement of water levels and angles of the ship. The ship weighting system comprises a collection module, and a computing server communicated with the collection module.

The collection module is configured to synchronously collect and report water level measurement values of a plurality of positions on the ship, trim angle measurement values of the plurality of positions, and trim angle angular velocity measurement values of the plurality of positions. The computing server is configured to send a synchronization command and a data collection command to the collection module, receive and process data reported by the collection module, and calculate a displacement volume of the ship. The data at least comprises the water level measurement values of the plurality of positions on the ship, the trim angle measurement values of the plurality of positions, and the trim angle angular velocity measurement values of the plurality of positions.

A ship size database, an installation correction database, a clock synchronization module, a collection command module, a measurement data pre-processing module, and a calculation module are installed in the computing server.

The ship size database is configured to pre-store ship size data.

The installation correction database is configured to store measurement offset values generated by the collection module during an installing process.

The clock synchronization module is configured to send a synchronization command to perform time synchronization on the collection module.

The collection command module is configured to send a data collection command to the collection module according to an operation of a user. The data collection command comprises a collection start time point, an amount of collection data, and a predetermined fixed interval value of collection time points of two adjacent collection data during a collection process.

The measurement data pre-processing module is configured to perform installation correction and integration of data to generate a real-time dynamic measurement data table according to the water level measurement values, the trim angle measurement values, and the trim angle angular velocity measurement values reported by the collection module and the measurement offset values stored in the installation correction database. The measurement data pre-processing module is configured to complete data tailoring of a complete trim motion period according to change characteristics of the data of the real-time dynamic measurement data table over time. The measurement data pre-processing module is further configured to calculate and generate an expected equilibrium state measurement array.

The calculation module is configured to calculate the displacement volume of the ship and obtain a weight of the ship according to the expected equilibrium state measurement array and the ship size data stored in the ship size database.

The present disclosure further provides a ship weighing method based on synchronous measurement of water levels and angles of the ship, which is executed by the ship weighing system. The ship weighing method comprises:

S1: establishing the ship size database and pre-storing the ship size data in the ship size database;

S2: establishing an installation correction database and storing measurement offset values generated by the collection module during the installation process;

S3: synchronizing the computing server with the collection module through network standard time or GPS standard time;

S4: synchronously collecting and obtaining the water level measurement values the trim angle measurement values, and trim angle angular velocity measurement values according to the collection start time point, the amount of collection data, and the predetermined fixed interval value of the collection time points of two adjacent collection data during the collection process;

S5: pre-processing the measurement data: offsetting and correcting the water level measurement values and the trim angle measurement values data to obtain water level correction values and trim angle correction values and performing the integration on the data to generate a real-time dynamic measurement data table according to the measurement offset values stored in the installation correction database; tailoring and restructuring water level correction values and trim angle correction values in a complete trim motion period of the real-time dynamic measurement data table to generate a trim motion period dynamic data table; and selecting or calculating equilibrium state water level values and equilibrium state trim angle values to generate the expected equilibrium state measurement array according to a trim motion period dynamic data table; and S6: calculating the displacement volume, calculating the displacement volume of the ship according to the expected equilibrium state measurement array and the ship size data, and obtaining the weight of the ship by multiplying a specific water density with a gravitational acceleration.

In the present disclosure, the water level measuring nodes and the angle measuring nodes are configured to synchronously collect the water level measurement values, the trim angle measurement values, and the trim angle angular velocity measurement values of the plurality of positions of the ship in a same state. The displacement volume of the ship is calculated based on the measurement data synchronously collected in the complete trim motion period, making a calculated result accurate. In addition, the draft of the stern of the ship is obtained by the electronic measuring tool. Based on the equidistant slice data of the ship size data, the displacement volume of the ship is divided into an accumulated volume of the ship below the slice section taken along the draft position of the stern of the ship, a volume of a trim wedge formed by trimming of the ship, and a volume of a vertical arch wedge formed by vertical arch deformation, which are respectively calculated and results thereof are combined to obtain the weight of the ship. Thus, calculation precision is further improved, and the actual weight of the ship is truly reflected.

DETAILED DESCRIPTION

The present disclosure is further illustrated through specific embodiments.

Embodiment 1

Figure 1:
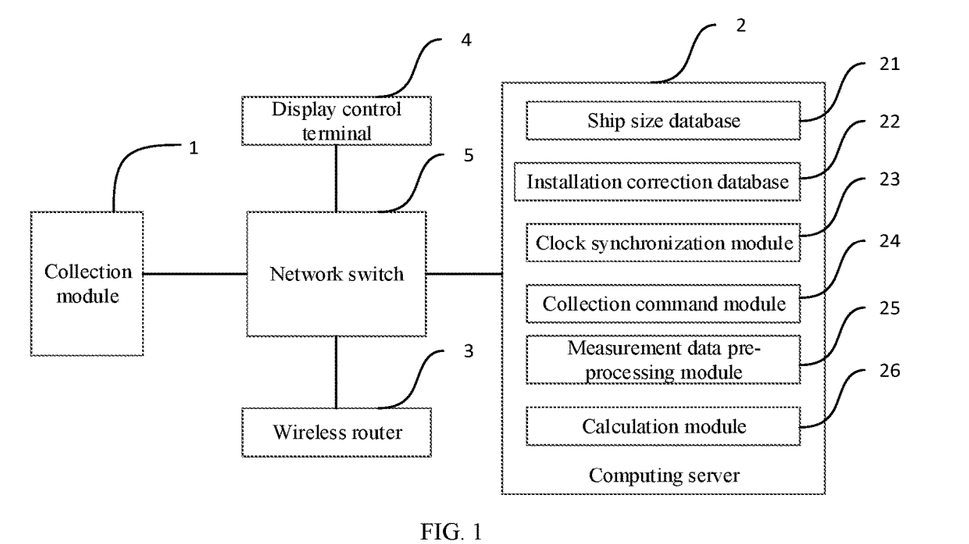
FIG. 1 is a block diagram of a ship weighing system based on synchronous measurement of water levels and angles of a ship according to one embodiment of the present disclosure.

FIG. 1 is a block diagram of a ship weighing system based on synchronous measurement of water levels and angles of a ship according to one embodiment of the present disclosure. As shown in FIG. 1, the present disclosure provides the ship weighing system based on the synchronous measurement of the water levels and the angles of the ship. The ship weighing system comprises a collection module 1 installed in the ship, a computing server 2 installed in the ship, a wireless router 3, a display control terminal 4, and a network switch 5 having a power over Ethernet (POE) power supply function. The network switch 5 is communicated with the collection module 1, the computing server 2, the wireless router 3, and the display control terminal 4 via Ethernet to from a corresponding Ethernet, which realizes data and command transmission between the network switch 5, the collection module 1, the computing server 2, the wireless router 3, and the display control terminal 4 In the Ethernet, the collection module 1 and the display control terminal 4 are connected with the Ethernet as clients for collecting measurement value data and recognizing a user's operation commands. The computing server 2 is connected with the Ethernet as a server for processing the collected measurement value data and sending corresponding control commands according to the user's operation commands. Specifically, the collection module 1 is configured to synchronously collect and report water level measurement values of a plurality of positions on the ship, trim angle measurement values of the plurality of positions, and trim angle angular velocity measurement values of the plurality of positions. The computing server 2 is configured to calculate a displacement volume of the ship according to the water level measurement values, the trim angle measurement values, and trim angle angular velocity measurement values reported by the collection module, and then a weight of the ship is obtained. The wireless router 3 accesses an external Internet through public wireless communication. After the displacement volume is calculated by the computing server 2, the wireless router 3 transmits the displacement volume of the ship to a cloud server for the user to retrieve according to a predetermined period or predetermined request. The display control terminal 4 is configured to recognize an operation of the user and realize human-machine interaction between the user and the computing server 2.

In other embodiments, the collection module 1 may be wirelessly connected to the wireless router 3 through WIFI. The computing server 2, the wireless router 3, and display control terminal 4 are connected with the network switch 5 via Ethernet lines. Alternatively, the network switch 5 is omitted, so that the collection module 1 is wirelessly connected with the wireless router 3 through WIFI. The computing server 2 and the display control terminal 4 are connected with the wireless router 3 through the Ethernet lines, which enable transfer of the data and commands between the collection module 1, the computing server 2, the wireless router 3, and the display control terminal 4.

Figure 2:
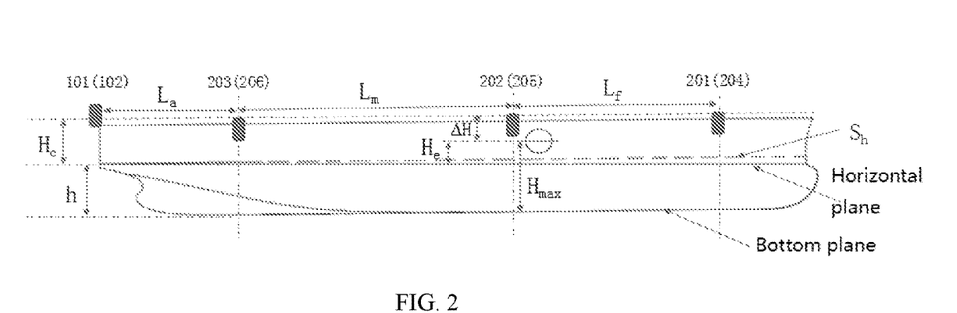
FIG. 2 is a schematic diagram showing an installation of a collection module.
Figure 3:
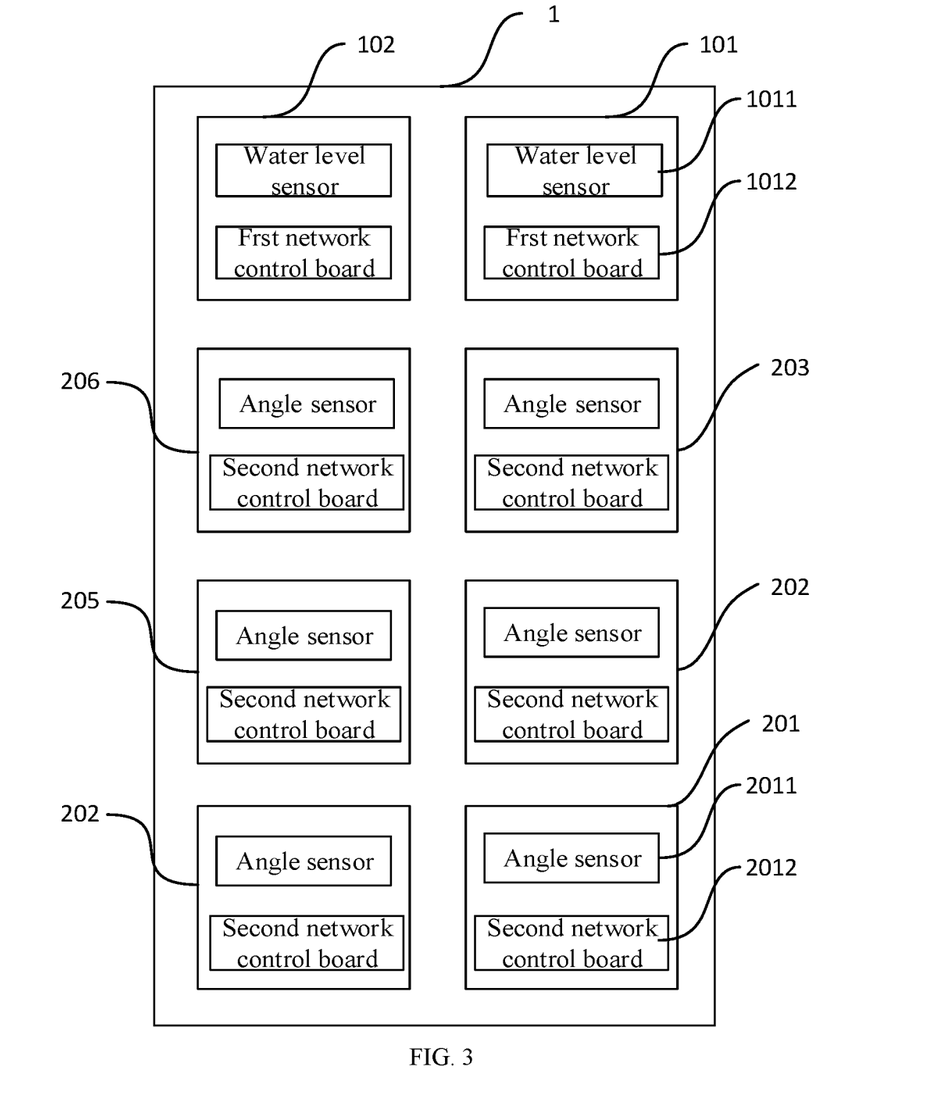
FIG. 3 is a schematic diagram of the collection module.

As shown in FIGS. 2 and 3, the collection module 1 comprises two water level measuring nodes 101 and 102 and six angle measuring nodes 201, 202, 203, 204, 205, and 206. The six angle measuring nodes 201, 202, 203, 204, 205, and 206 comprise two front angle measuring nodes 201 and 204, two middle angle measuring nodes 202 and 205, and two rear angle measuring nodes 203 and 206. The two water level measuring nodes 101 and 102 are respectively arranged on a port side of a stern of the ship and a starboard side of stern of the ship. The two water level measuring nodes are symmetrically arranged with respect to a middle longitudinal section of the ship. Each of the water level measuring nodes is configured to collect a height difference between each of the water level measuring nodes and a horizontal plane at a corresponding side of the stern. Each height difference is regarded as a water level measurement value of the water level measurement values. The two front angle measuring nodes 201 and 204 are respectively arranged on the port side of the ship and the starboard side of the ship and are corresponding to a front portion of the ship. The two middle angle measuring nodes 202 and 205 are respectively arranged on the port side of the ship and the starboard side of the ship and are corresponding to a middle portion of the ship. The two rear angle measuring nodes 203 and 206 are respectively arranged on the port side of the ship and the starboard side of the ship and are corresponding to a rear portion of the ship. The six angle measuring nodes 201, 202, 203, 204, 205, and 206 are configured to collect the trim angle measurement values and the trim angle angular velocity measurement values of the angle measuring nodes arranged at the port side of the ship and the starboard side of the ship and respectively corresponding to the front portion, the middle portion, and the rear portion of the ship. In the embodiment, a longitudinal projections of an installation center of each of the angle measuring nodes 201, 202, 203, 204, 205, and 206 is corresponding to a positions of a corresponding draft mark of the six draft marks arranged on six sides of the ship. In other embodiments, the six angle measuring nodes 201, 202, 203, 204, 205, and 206 are installed according to a structure and a size of the ship. For example, the two front angle measuring nodes 201 and 204 are respectively installed on the port side and the starboard side of the ship and are corresponding to a projection position of a joint point of a bow column and a keel on the middle longitudinal section of the ship. The two middle angle measuring nodes 202 and 205 are respectively installed on the port side and the starboard side of the ship and are corresponding to a projection position of a midpoint of the keel on the middle longitudinal section of the ship. The two rear angle measuring nodes 203 and 206 are respectively installed on the port side and the starboard side of the ship and are corresponding to a projection position of a joint point of a stern column and the keel on the middle longitudinal section of the ship.

Each of the water level measuring nodes 101 and 102 comprises a water level sensor 1011 and a first network control board 1012. Each water level sensor 1011 is communicated with a corresponding first network control board 1012 through a first serial port. Each first network control board 1012 obtains external power supply from the network switch 5 having the POE function through a first Ethernet interface. Each first network control board 1012 supplies power to a corresponding water level sensor 1011 after internal voltage conversion. Each first network control board 1012 is further configured to temporarily store a water level measurement value collected by the corresponding water level sensor 1011, and is configured to report the water level measurement value to the computing server 2.

Each of the angle measuring nodes 201, 202, 203, 204, 205, and 206 comprises an angle sensor 2011 and a second network control board 2012. Each angle sensor 2011 is communicated with a corresponding second network control board 2012 by a second serial port. Each second network control board 2012 obtains external power supply from the network switch 5 having the POE function through a second Ethernet interface. Each second network control board 2012 supplies power to a corresponding angle sensor 2011 after internal voltage conversion. Each second network control board 2012 is further configured to temporarily store a trim angle measurement value and a trim angle angular velocity measurement value collected by the corresponding angle sensor 2011, and is configured to report the trim angle measurement value and the trim angle angular velocity measurement value to the computing server 2.

A ship size database 21, an installation correction database 22, a clock synchronization module 23, a collection command module 24, a measurement data pre-processing module 25, and a calculation module 26 are installed in the computing server 2.

Therefore, the computing server 2 calculates the displacement volume of the ship and then calculates the weight of the ship according to the water level measurement values collected by the water level measuring nodes 101 and 102, the trim angle measurement values collected by the angle measuring nodes, and the trim angle angular velocity measurement values collected by the angle measuring node 201, 202, 203, 204, 205, and 206.

The ship size database 21 is configured to pre-store ship size data. The ship size data comprises a ship designed load draft value $H_{max}$ marked by a summer load line of the ship, distances $L_f$, $L_m$, $L_a$ between projections of installation centers of the angle measuring nodes on the middle longitudinal section of the ship ($L_f$ is a distances between a projection of an installation center of each of the front angle measuring nodes 201 and 204 on the middle longitudinal section of the ship and a projection of an installation center of a corresponding middle angle measuring node on the middle longitudinal section of the ship. Each of the front angle measuring nodes 201 and 204 is arranged on the port side of the ship or the starboard side of the ship. $L_m$ is a distances between a projection of an installation center of each of the middle angle measuring nodes 202 and 205 on the middle longitudinal section of the ship and a projection of an installation center of a corresponding rear angle measuring nodes on the middle longitudinal section of the ship. Each of the middle angle measuring nodes 202 and 205 is arranged on the port side of the ship or the starboard side of the ship. $L_a$ is a distances between a projection of an installation center of each of the rear angle measuring nodes 203 and 206 on the middle longitudinal section of the ship and a projection of an installation center of a corresponding water level measuring nodes on the middle longitudinal section of the ship. Each of the rear angle measuring nodes 203 and 206 is arranged on the port side of the ship or the starboard side of the ship), a distance between projections of installation centers of the two water level measuring nodes on the middle longitudinal section of the ship, and a data table. The date table comprises section areas of slice sections $S_h$ generated by making equidistant slices parallel to a bottom plane of the ship along a height direction of the ship from the bottom plane of the ship, a maximum length $L_h$ between the bow and the stern of the ship in each of the slice sections, and an accumulated volume $V_h$ of the ship below the slice sections.

In the embodiment, although the distances between projections on the middle longitudinal section of the ship of the installation centers of the angle measuring nodes arranged on the port side and the starboard side of the ship are represented by $L_f$, $L_m$, $L_a$. The angle measuring nodes arranged on the port side of the ship do not completely symmetric to the angle measuring nodes arranged on the starboard side of the ship after being installed.

It is understood that when $L_f$, $L_m$, $L_a$ represent the distances between the projections on the middle longitudinal section of the ship of the installation centers of the angle measuring nodes arranged on the port side and the starboard side of the ship Values of $L_f$, $L_m$, $L_a$ are not necessarily equal. When necessary, $L_{f1}$, $L_{m1}$, $L_{a1}$ represent the distances between the projections on the middle longitudinal section of the ship of the installation centers of the angle measuring nodes arranged on the port side of the ship. $L_{f2}$, $L_{m2}$, $L_{a2}$ represent the distances between the projections on the middle longitudinal section of the ship of the installation centers of the angle measuring nodes arranged on the starboard side of the ship. Therefore, parameters of the angle measuring nodes arranged on the port side and parameters of the angle measuring nodes arranged on the starboard side of the ship are divided.

After the water level measuring nodes 101 and 102 and the angle measuring nodes 201, 202, 203, 204, 205, and 206 are installed, due to flatness differences of installation surfaces and differences of installation positions, installation offset correction is performed on each of the measuring nodes after installation.

The installation correction database 22 stores measurement offset values generated by the collection module during an installing process of the water level measuring nodes 101 and 102 and the angle measuring nodes 201, 202, 203, 204, 205, and 206. The measurement offset values comprise water level measurement offset values and trim angle measurement offset values. The water level measurement offset values are respectively a vertical height difference $\Delta H$ between a measurement zero scale measured by each of the water level measuring nodes 101 and 102 and the summer load line of the ship after the water level measuring nodes are installed. The trim angle measurement offset values are respectively an offset difference between an initial trim angle measurement value measured by each of the angle measuring nodes 201, 202, 203, 204, 205, and 206 and an actual value of an installation trim angle of each of the angle measuring nodes after the angle measuring nodes are installed.

The actual value of the installation trim angle of the front angle measuring nodes, the actual value of the installation trim angle of the middles angle measuring nodes, and the actual value of the installation trim angle of the rear angle measuring nodes are respectively:

$$Y_m = \arctan \lfloor (h_a - h_f)/(L_f + L_m) \rfloor \quad (1)$$

$$Y_f = \arctan \lfloor (h_m - h_f)/L_f \rfloor \quad (2)$$

$$Y_a = \arctan [(h_a - h_m)/L_m] \quad (3)$$

$Y_f$, $Y_m$, and $Y_a$ are respectively an actual value of an installation trim angle of each of the front angle measuring nodes, an actual value of an installation trim angle of each of the middle angle measuring nodes, and an actual value of an installation trim angle of each of the rear angle measuring nodes. $h_f$ is a draft reading obtained by visual reading of an actual front draft mark of the ship or $h_f$ is the draft reading obtained by measuring the actual front draft mark of the ship via an electronic measuring tool. $h_m$ is a draft reading obtained by visual reading of an actual middle draft mark of the ship or $h_m$ is a draft reading obtained by measuring the actual middle draft mark of the ship via the electronic measuring tool. $h_a$ is a draft reading obtained by visual reading of an actual rear draft mark of the ship or $h_a$ is a draft reading obtained by measuring the actual rear draft mark of the ship via the electronic measuring tool. $L_m$ is the distances between the projection of the installation center of each of the rear angle measuring nodes 203 and 206 on the middle longitudinal section of the ship and the projection of the installation center of the corresponding middle angle measuring node on the middle longitudinal section of the ship. Each of the rear angle measuring nodes 203 and 206 is arranged on the port side of the ship or the starboard side of the ship. $L_f$ is the distances between the projection of the installation center of each of the front angle measuring nodes 201 and 204 on the middle longitudinal section of the ship and the projection of the installation center of the corresponding middle angle measuring node on the middle longitudinal section of the ship. Each of the front angle measuring nodes 201 and 204 is arranged on the port side of the ship or the starboard side of the ship.

The clock synchronization module 23 performs operations when each of the measuring nodes registers as an Ethernet client to the computing server 2 to complete time synchronization of the computing server 2 with the water level measuring nodes 101 and 102 and the angle measuring nodes 201, 202, 203, 204, 205, and 206 by using the network standard time that complies with the NTP protocol. Thus, time of internal clock in the water level measuring nodes 101 and 102 and time of internal clocks in the angle measuring nodes 201, 202, 203, 204, 205, and 206 are consistent, which realizes a purpose that a position of the ship is collected in same acquisition time point.

Figure 4:
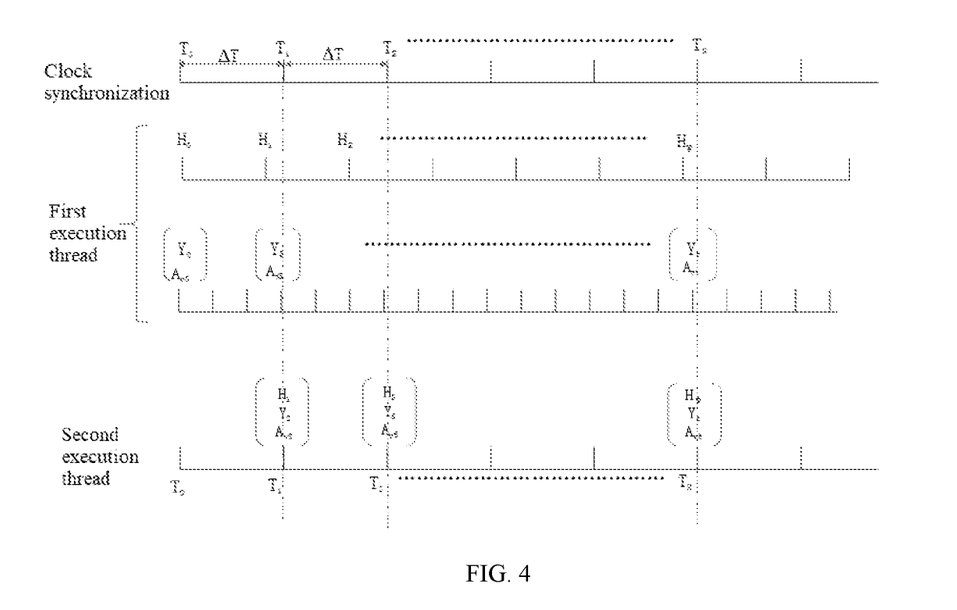
FIG. 4 is a schematic diagram showing a process of data collection.

As shown in FIG. 4, the collection command module 24 synchronously sends a data collection command to the water level measuring nodes 101 and 102 and the angle measuring nodes 201, 202, 203, 204, 205, and 206 according to a data collection operation performed by the user at the display control terminal 4. The data collection command comprises a collection start time point $T_0$, an amount of collection data N, and a predetermined fixed interval value $\Delta T$ of collection time points of two adjacent collection data during a collection process (i.e., an interval between a collection time point of a $n-1^{th}$ data and a collection time point of a $n^{th}$ data, and $\Delta T$ is greater than a data collection period of each water level sensor 1011 and a data collection period of each angle sensor 2011). Then the collection time point $T_n$ corresponding to the $n^{th}$ data is $T_0 + n \cdot \Delta T$. The collection start time point $T_0$ may be a future time point after the data collection command is sent, or the collection start time point $T_0$ may be a delayed time period counted from a time point when the data collection command is sent.

The data collection command is executed by each first network control board 1012 and each second network control board 2012. An execution process thereof comprises two parallel execution threads. Specifically, in a first execution thread, each first network control board 1012 arranged in each of the water level measuring nodes 101, 102 continuously reads water level measurement values $\lfloor H_0, H_1, \ldots, H_\varphi \rfloor$ of each water level sensor 1011 from $T_0$ ($\varphi$ is the number of the water level measurement values continuously reported by each water level sensor 1011) and the water level measurement values are temporarily stored in a register of a corresponding first network control board 1012. In the first execution thread, each second network control board 2012 in each of the angle measuring nodes 201, 202, 203, 204, 205, and 206 continuously reads the trim angle measurement values $[Y_0, Y_1, \ldots, Y_t]$ (t is the number of the trim angle measurement values continuously reported by each angle sensor 2011) measured by each angle sensor 2011 and the trim angle angular velocity measurement values $[Av_0, Av_1, \ldots, Av_t]$ from $T_0$. The trim angle measurement values and the trim angle angular velocity measurement values are temporarily stored in a register of a corresponding second network control board 2012. In the register of each first network control board, a water level measurement value read in a next time point would overwrite a water level measurement value read corresponding to a previous time point. In the register of each second network control board, a trim angle measurement value and a trim angle angular velocity measurement value read in the next time point overwrite a trim angle measurement value and a trim angle angular velocity measurement value read in the previous time point. In a second execution thread, each first network control board 1012 reads the water lever measurement values for N times from $(T_0+\Delta T)$ in the interval $\Delta T$ ($\Delta T$ is greater than the data collection period of each water level sensor 1011 and the data collection period of each angle sensor 2011). In the second execution thread, each second network control board 2012 reads the trim angle measurement values and the trim angle angular velocity measurement values for N times from $(T_0+\Delta T)$ in the interval $\Delta T$. In the second execution thread, each first network control board 1012 and each second network control board 2012 read the measurement values synchronously measured by each water level sensor 1011 and each angle sensor 2011 from a corresponding register. Namely, a set of measurement values read at the collection time point $T_1$ is $[H_1, Y_3, Av_3]$, and a set of measurement values read at the collection time point $T_2$ is $[H_2, Y_6, Av_6]$. The measurement values are read for N times to obtain the real-time dynamic measurement data table $\lfloor (H_1, Y_3, Av_3), (H_2, Y_6, Av_6), \ldots, (H_\varphi, Y_t, Av_t] \rfloor$.

Figure 5:
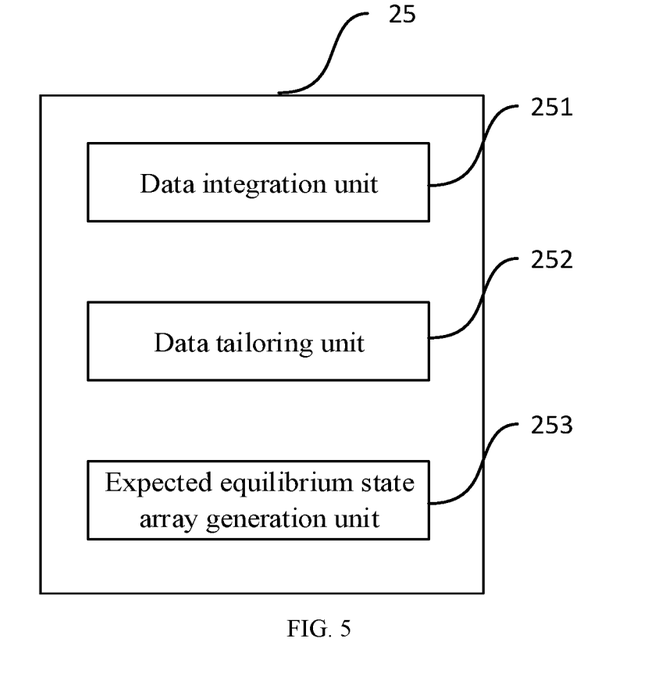
FIG. 5 is a schematic diagram of a measurement data pre-processing module.

As shown in FIG. 5, the measurement data pre-processing module 25 comprises a data integration unit 251, a data tailoring unit 252, and an expected equilibrium state array generation unit 253.

The data integration unit 251 is configured to receive the water level measurement values, the trim angle measurement values, and the trim angle angular velocity measurement values reported by the collection module 1; and the data integration unit 251 is configured to perform offset correction on the water level measurement values and the trim angle measurement values based on the water level measurement offset values and the trim angle measurement offset values to obtain water level correction values and trim angle correction values. The data integration unit 251 is further configured to perform association and reforming on the water level correction values, the trim angle correction values, and the trim angle angular velocity measurement values by taking each of the collection time points corresponding to each data as an index to generate the real-time dynamic measurement data table. The data tailoring unit 252 is configured to tailor data in the real-time dynamic measurement data table to obtain the date of the ship in the interval and generate a trim motion period dynamic data table. The expected equilibrium state array generation unit 253 is configured to determine the collection time point of the ship in the expected equilibrium state in the trim motion period and select and calculate water level correction values and trim angle correction values corresponding to the collection time point according to data in the trim motion period dynamic data table. Then the expected equilibrium state array generation unit 253 is configured to obtain an equilibrium state water level value and an equilibrium state trim angle value associated of the ship in the expected equilibrium state in a motion balance time point of the ship to form the expected equilibrium state measurement array.

The data integration unit 251 calculates the water level correction values and trim angle correction values according to following formulas:

$$H_c = H_t - \Delta H \quad (4)$$

$$Y_c = Y_t - \Delta Y \quad (5)$$

$H_c$ is a water level correction value. $H_t$ is a water level measurement value reported by the water measuring nodes 101 and 102, i.e. $H_1, H_2 \ldots H_\varphi$. $\Delta H$ is the vertical height difference between the measurement zero scale measured by the water level measuring nodes 101 and 102 stored in the installation correction database after the water level measuring nodes are installed and a summer load line of the ship. $Y_c$ is a trim angle correction value. $Y_t$ is a trim angle measurement value reported by the trim angle measuring nodes 201, 202, 203, 204, 205, and 206, i.e. $Y_3, Y_6, \ldots, Y_t$. $\Delta Y$ is an offset difference of the trim angle measuring nodes 201, 202, 203, 204, 205, and 206 stored in the installation correction database.

Figure 6:
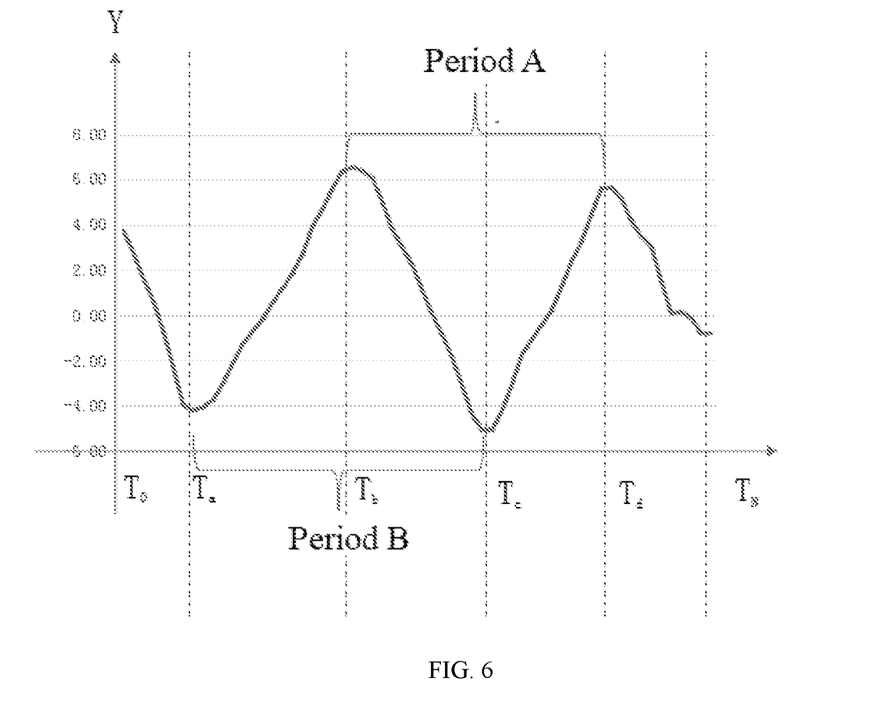
FIG. 6 is a graph of the trim angle measurement values of the ship with time.

As shown in FIG. 6, a graph showing a change of the trim angle correction value with the collection time is drew, where the trim angle correction values in the real-time dynamic measurement data table are treated as a vertical coordinate and the collection time points are treated as a horizontal coordinate. It is noted in the graph that a dynamic motion of the ship is approximated as a sinusoidal curve with random changes in frequency and amplitude. Since the collection start time point $T_0$ determined by the user is random, the collection start time point $T_0$ generally does not coincide with a origin of the sinusoidal curve. Therefore, in the data analysis, data tailoring of a complete trim motion period is performed on the real-time dynamic measurement data table to ensure the integrity of source data for statistical analysis. Specifically, the data tailoring unit 252 tailors collection time points in the complete trim motion period and abandons the rest of the collection time points according to the graph showing the change of the trim angle correction value with the collection time, and forms the trim motion period dynamic data table. The trim motion period dynamic data table formed by the trim motion period A is represented by $[(H_b, Y_b, Av_b), \ldots, (H_d, Y_d, Av_d)]$. The trim motion period dynamic data table formed by the trim motion period B is represented by $[(H_a, Y_a, Av_a), \ldots, (H_c, Y_c, Av_c)]$.

In the embodiment, when the expected equilibrium state array generation unit 253 generates the expected equilibrium state measurement array according to the trim motion period dynamic data table, all of the water level height correction values and all of the trim angle correction values in the trim motion period dynamic data table are respectively averaged to obtain an equilibrium state water level value and an equilibrium state trim angle value, thereby forming the expected equilibrium state measurement array [He,Ye].

In other embodiments, the expected equilibrium state measurement array [He,Ye] is obtained by:

The expected equilibrium state array generation unit 253 generates the expected equilibrium state measurement array by respectively taking a median of all of the water level height correction values and taking a median of all of the trim angle correction values in the trim motion period dynamic data table as the equilibrium state water level value and the equilibrium state trim angle value, thereby forming the expected equilibrium state measurement array [He,Ye]; or the expected equilibrium state array generation unit 253 retrieves an associated collection time point having the trim angle angular velocity measurement value with a maximum absolute value in the trim motion period dynamic data table. Then, a water level correction value and a trim angle correction value corresponding to the associated collection time point as the equilibrium state water level value and the equilibrium state trim angle value, thereby forming the expected equilibrium state measurement array.

Figure 7:
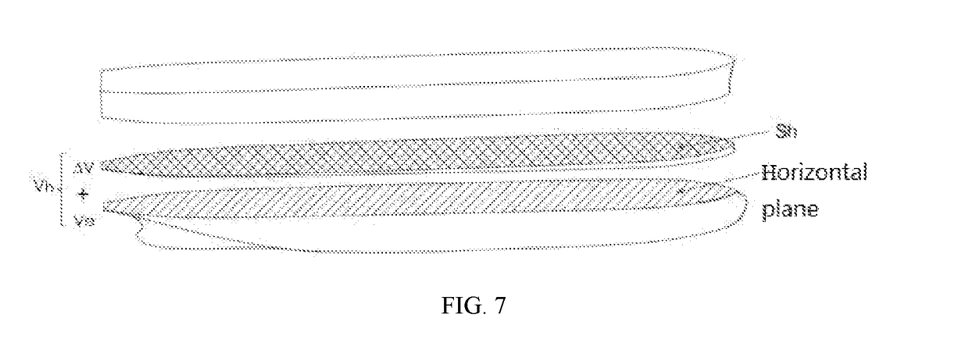
FIG. 7 is a schematic diagram showing a slicing process of the ship.

The calculation module is configured to calculate a water level of the stern of the ship after a heeling correction according to water level values corresponding to the two water level measuring nodes 101 and 102 in the expected equilibrium state measurement array. Then the calculation module retrieves in the shop size database and calculates a draft of the stern of the ship after the heeling correction, a section area of a slice section parallel to the bottom plane of the ship and corresponding to a draft position of the stern, a maximum length of the stern of the ship in the slice sections, and an accumulated volume of the ship below the slice section, and a volume of a trim wedge formed by the slice section parallel to the bottom plane of the ship and taken along the draft position of the stern and an actual horizontal plane. Then, the calculation module calculates to obtain the displacement volume of the ship without considering a correction on vertical arch deformation of the ship.

Specifically, since the two water level measurement nodes 101 and 102 are symmetrically arranged along the middle longitudinal section of the ship. After the ship is restored to a heeling level position, the water level of the stern after the heeling correction is a height difference between a water entry point of the stern and the water level measurement nodes 101 and 102. Therefore, the water level He of the stern of the ship after the heeling correction is calculated by following formula:

$$H_e = \frac{H_{e101} + H_{e102}}{2} \tag{6}$$

$H_e$ is the water level of the stern of the ship after the heeling correction. $H_{e101}$ and $H_{e102}$ are respectively the equilibrium state water level values in the expected equilibrium state measurement array corresponding to the water level measuring nodes 101 and 1012 arranged on the port side and the starboard side of the stern of the ship.

The calculation module retrieves in the shop size database and calculates the draft h of the stern of the ship after the heeling correction by follow formula:

$$h = H_{max} - He \tag{7}$$

h is the draft of the stern of the ship after the heeling correction. $H_{max}$ is the ship designed load draft value marked by a summer load line of the ship.

As shown in FIG. 7, when the calculation module 26 calculates the section area of the slice section parallel to the bottom plane of the ship and taken along the draft position of the stern, the maximum length of the stern of the ship in the slice sections, and the accumulated volume of the ship below the slice section, a horizontal slice parallel to the bottom plane of the ship is made along the draft of the stern h at a water level. The draft of the stern h of the ship is used as an index, and section areas of the heights of two adjacent equidistant slices $h_n$ and $h_{n+1}$ corresponding to the draft of the stern h of the ship, the maximum length of the stern of the ship in the slice sections, and the accumulated volume of the ship below the slice sections are retrieved. Then, the calculation module respectively calculates the section area of the slice section $S_h$ parallel to the bottom plane of the ship and taken along the draft position of the stern, the maximum length of the stern $L_h$ of the ship in the slice sections, and the accumulated volume $V_h$ of the ship below the slice section:

$$S_h = S_n + \frac{S_{n+1} - S_n}{h_{n+1} - h_n} \times (h - h_n) \tag{8}$$

$$L_h = L_n + \frac{L_{n+1} - L_n}{h_{n+1} - h_n} \times (h - h_n) \tag{9}$$

$$V_h = V_n + \frac{V_{n+1} - V_n}{h_{n+1} - h_n} \times (h - h_n) \tag{10}$$

$S_h$, $L_h$, and $V_h$ are respectively the section area of the slice section parallel to the bottom plane of the ship and taken along the draft position of the stern, the maximum length of the stern of the ship in the slice sections, and the accumulated volume of the ship below the slice section. $h_n$ and $h_{n+1}$ are heights of two adjacent equidistant slices corresponding to h, the draft of the stern of the ship after the heeling correction, in the ship size database, and $h_n \leq h < h_{n+1}$. $S_n$, $L_n$, and $V_n$ are respectively a section area of a slice section corresponding to $h_n$ in the ship size database, the maximum length of the stern of the ship, and an accumulated volume of the ship below the slice section corresponding to $h_n$. $S_{n+1}$, $L_{n+1}$, and $V_{n+1}$ are respectively a section area of a slice section corresponding to $h_{n+1}$ in the ship size database, the maximum length of the stern of the ship, and an accumulated volume of the ship below the slice section corresponding to $h_{n+1}$.

The calculation module 26 calculates the volume of the trim wedge $\Delta V$ according to the section area of the slice section $S_h$ and the maximum length of the stern $L_h$ of the ship in the slice sections.

$$\Delta V = \frac{1}{2} \times S_h \times L_h \times \tan(Ye_0) \tag{11}$$

$\Delta V$ is the volume of the trim wedge. $Ye_0$ is a trim angle value of the ship. In the embodiment, an arithmetic average of the equilibrium state trim angle values of the two middle angle measuring nodes 202 and 205 on the middle portion of the ships is approximated as the trim angle value of the ship.

Furthermore, the calculation module calculates the displacement volume of the ship without considering the correction on the vertical arch deformation of the ship, according to the volume of the trim wedge $\Delta V$ and the accumulated volume $V_h$ of the ship below the slice section:

$$V_{e0} = V_h - \Delta V \tag{12}$$

Specifically, when the stern of the ship is tilted, the trim angle $Ye_0$ of the ship is greater than zero and $\Delta V$ is positive. When the bow of the ship is tilted, the trim angle of the ship is less than zero and $\Delta V$ is negative.

Figure 8:
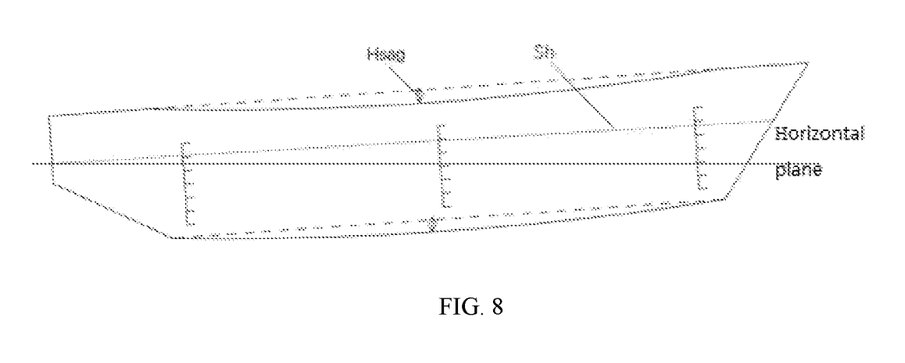
FIG. 8 is schematic diagram of the ship in a vertical arch deformation state.

As shown in FIG. 8, since the middle portion of the ship forms a certain degree of vertical arch deformation in actual environmental conditions, a change in the displacement volume of the ship generated by the vertical arch deformation is taken into account. Therefore, the calculation module 26 further calculates a volume of a vertical arch wedge formed by the ship after the vertical arch deformation. Specifically, when the vertical arch deformation is generated on the ship, a deformed shape is approximated as the vertical arch wedge, and a bottom area of the vertical arch wedge is approximated as the section area of the slice section $S_h$ parallel to the bottom plane of the ship and at the draft h of the ship, and then a height of the vertical arch wedge is calculated to obtain the volume of the vertical arch wedge.

The height of the vertical arch wedge $H_{sag}$ is calculated by following formula:

$$H_{sag} = \frac{1}{4}[L_{f1} \times \tan(Ye_{201} - Ye_{202}) + L_{f2} \times \tan(Ye_{204} - Ye_{205}) + L_{m1} \times \tan(Ye_{202} - Ye_{203}) + L_{m2} \times \tan(Ye_{205} - Ye_{206})] \quad (13)$$

$L_{f1}$ is a distances between a projection of an installation center of a first front angle measuring node 201 arranged on the port side of the ship on the middle longitudinal section of the ship and a projection of an installation center of a corresponding middle angle measuring node on the middle longitudinal section of the ship. $L_{f2}$ is a distances between a projection of an installation center of a second front angle measuring node 204 arranged on the starboard side of the ship on the middle longitudinal section of the ship and a projection of an installation center of a corresponding middle angle measuring node on the middle longitudinal section of the ship. $L_{m1}$ is a distances between a projection of an installation center of a first middle angle measuring node 202 arranged on the port side of the ship on the middle longitudinal section of the ship and a projection of an installation center of a corresponding rear angle measuring node on the middle longitudinal section of the ship. $L_{m2}$ is a distances between a projection of an installation center of a second middle angle measuring node 205 arranged on the starboard side of the ship on the middle longitudinal section of the ship and a projection of an installation center of a corresponding rear angle measuring node on the middle longitudinal section of the ship. $Ye_{201}$, $Ye_{202}$, and $Ye_{203}$ are respectively an equilibrium state trim angle value of a front portion of the port side of the shop, an equilibrium state trim angle value of a middle portion of the port side of the shop, and an equilibrium state trim angle value of a rear portion of the port side of the shop. $Ye_{201}$ $Ye_{202}$, and $Ye_{203}$ are respectively an equilibrium state trim angle value of a front portion of the starboard side of the shop, an equilibrium state trim angle value of a middle portion of the starboard side of the shop, and an equilibrium state trim angle value of a rear portion of the starboard side of the shop.

In the embodiment, when the middle portion of the ship is sagged, the equilibrium state trim angle values corresponding to the angle measuring nodes on the port side and starboard side of the ship have the following relationship: $Ye_{201} > Ye_{202} > Ye_{203}$ and $Ye_{204} > Ye_{205} > Ye_{206}$. At this time, the height of the vertical arch wedge $H_{sag}$ is positive. When the middle portion of the ship is arched up, the equilibrium state trim angle values corresponding to the angle measuring nodes on the port side and starboard side of the ship have the following relationship: $Ye_{201} < Ye_{202} < Ye_{203}$ and $Ye_{204} < Ye_{205} < Ye_{206}$. At this time, the height of the vertical arch wedge $H_{sag}$ is negative.

The volume of the vertical arch wedge $V_{sag}$ is calculated according to the height of the vertical arch wedge $H_{sag}$, by following formula:

$$V_{sag} = \frac{1}{2} \times S_h \times H_{sag} \quad (14)$$

Finally, the displacement volume of the ship $V_e$ is calculated according to the displacement volume of the ship $V_{e0}$ without considering the correction on the vertical arch deformation of the ship and the volume of the vertical arch wedge $V_{sag}$, following formula:

$$V_e = V_{e0} + V_{sag} \quad (15)$$

In the formula (15), $V_e$ is the displacement volume of the ship that finally calculated.

According to Archimedes' theorem, the weight of the ship is obtained by multiplying the displacement volume of the ship with a water density and a gravitational acceleration of a location of the ship.

In the ship weighing system based on synchronous measurement of the water levels and the angles of the ship of the present disclosure, the water level measuring nodes 101 and 102 and the angle measuring nodes 201, 202, 203, 204, 205, and 206 are configured to synchronously collect the measurement values of the ship in the same state. Based on the equidistant slice data of the ship size data, the displacement volume of the ship is divided into the accumulated volume of the ship below the slice section corresponding to the draft of the stern of the ship, the volume of the trim wedge formed by trimming of the ship, and the volume of the vertical arch wedge formed after vertical arch deformation, which are respectively calculated and results thereof are combined to obtain the weight of the ship. Thus, calculation precision is further improved, and the actual weight of the ship is truly reflected.

Embodiment 2

Figure 9:
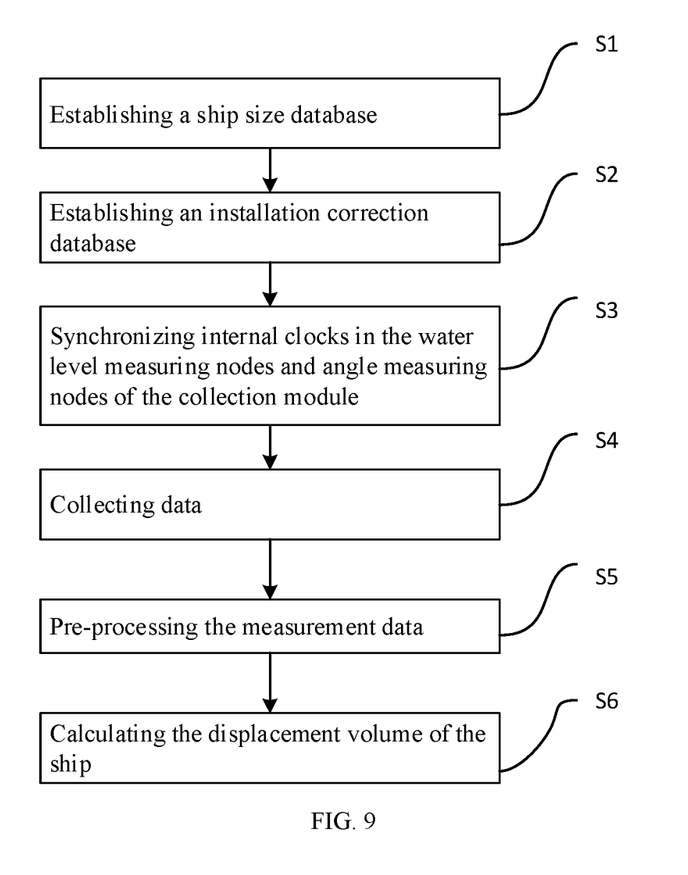
FIG. 9 is flow chart of a ship weighing method based on synchronous measurement of the water levels and angles of the ship according to one embodiment of the present disclosure.

FIG. 9 is flow chart of a ship weighing method based on synchronous measurement of the water levels and angles of the ship according to one embodiment of the present disclosure.

The ship weighing method based on synchronous measurement of water levels and angles of the ship is executed by the ship weighing system described above. The ship weighing method comprises following steps:

S1: establishing the ship size database 21;

Specifically, the ship size data is pre-stored in the ship size database 21.

The ship size data comprises, but is not limited to, the ship designed load draft value $H_{max}$ marked by the summer load line of the ship, distances $L_f$, $L_m$, $L_a$ between projections of installation centers of the angle measuring nodes on the middle longitudinal section of the ship ($L_f$ is the distances between the projection of the installation center of each of the front angle measuring nodes 201 and 204 on the middle longitudinal section of the ship and the projection of the installation center of the corresponding middle angle measuring node on the middle longitudinal section of the ship. Each of the front angle measuring nodes 201 and 204 is arranged on the port side of the ship or the starboard side of the ship. $L_m$ is the distances between the projection of the installation center of each of the middle angle measuring nodes 202 and 205 on the middle longitudinal section of the ship and the projection of the installation center of the corresponding rear angle measuring nodes on the middle longitudinal section of the ship. Each of the middle angle measuring nodes 202 and 205 is arranged on the port side of the ship or the starboard side of the ship. $L_a$ is the distances between the projection of the installation center of each of the rear angle measuring nodes 203 and 206 on the middle longitudinal section of the ship and a projection of the installation center of the corresponding water level measuring nodes on the middle longitudinal section of the ship. Each of the rear angle measuring nodes 203 and 206 is arranged on the port side of the ship or the starboard side of the ship), the distance between the projections of the installation centers of the two water level measuring nodes on the middle longitudinal section of the ship, and a data table. The date table comprises the section areas $S_h$ of the slice sections generated by making equidistant slices parallel to the bottom plane of the ship along the height direction of the ship from the bottom plane of the ship, the maximum length $L_h$ between the bow and the stern of the ship in each of the slice sections, and the accumulated volume $V_h$ of the ship below the slice sections.

S2: establishing an installation correction database 22;

Specifically, the measurement offset values generated by the water level measuring nodes 101 and 102 and the angle measuring nodes 201, 202, 203, 204, 205, and 206 during the installation process are stored in the installation correction database. The measurement offset values comprise the water level measurement offset values and the trim angle measurement offset values. In the embodiment, the water level measurement offset values are respectively the vertical height difference ΔH between the measurement zero scale measured by each of the water level measuring nodes 101 and 102 and the summer load line of the ship after the water level measuring nodes are installed. The trim angle measurement offset values are respectively the offset difference between the initial trim angle measurement value measured by each of the angle measuring nodes 201, 202, 203, 204, 205, and 206 and the actual value of the installation trim angle of each of the angle measuring nodes after the angle measuring nodes are installed.

S3: synchronizing internal clocks in the water level measuring nodes and angle measuring nodes of the collection module;

Based on the clock synchronization module 23, according to the user's operations, the wireless router 3 uses the network standard time that complies with the NTP protocol to synchronize the collection module 1 and the computing server 2, so the water level measuring nodes 101, 102 and angle measuring nodes 201, 202, 203, 204, 205, and 206 collect measurement values of the ship at the same state.

S4: collecting data;

Based on the collection module 1, the collection command module 24 synchronously sends the data collection command to the water level measuring nodes 101 and 102 and the angle measuring nodes 201, 202, 203, 204, 205, and 206. The data collection command comprises the collection start time point $T_0$, the amount of collection data N, and the predetermined fixed interval value of collection time points of two adjacent collection data during a collection process ΔT (i.e., the interval between a collection time point of the n-1$^{th}$ data and the collection time point of the n$^{th}$ data, and ΔT is greater than the data collection period of each water level sensor 1011 and the data collection period of each angle sensor 2011). Then the collection time point $T_n$ corresponding to the n$^{th}$ data is $T_0+n*\Delta T$. The collection start time point $T_0$ may be the future time point after the data collection command is sent, or the collection start time point $T_0$ may be the delayed time period counted from the time point when the data collection command is sent.

The execution process performed by the data integration unit 251 comprises two parallel execution threads. Specifically, in the first execution thread, each first network control board 1012 arranged in each of the water level measuring nodes 101, 102 continuously reads the water level measurement values $[H_0, H_1, \ldots, H_{100}]$ of each water level sensor 1011 from $T_0$ (φ is the number of the water level measurement values continuously reported by each water level sensor 1011) and the water level measurement values are temporarily stored in the register of the corresponding first network control board 1012. In the first execution thread, each second network control board 2012 in each of the angle measuring nodes 201, 202, 203, 204, 205, and 206 continuously reads the trim angle measurement values $[Y_0, Y_1, \ldots, Y_t]$ (t is the number of the trim angle measurement values continuously reported by each angle sensor 2011) measured by each angle sensor 2011 and the trim angle angular velocity measurement values $[Av_0, Av_1, \ldots, Av_t]$ from $T_0$. The trim angle measurement values and the trim angle angular velocity measurement values are temporarily stored in the register of the corresponding second network control board 2012. In the register of each first network control board, the water level measurement value read in the next time point would overwrite the water level measurement value read corresponding to the previous time point. In the register of each second network control board, the trim angle measurement value and the trim angle angular velocity measurement value read in the next time point overwrite the trim angle measurement value and the trim angle angular velocity measurement value read in the previous time point. In the second execution thread, each first network control board 1012 reads the water lever measurement values for N times from $(T_0+\Delta T)$ in the interval ΔT (ΔT is greater than the data collection period of each water level sensor 1011 and the data collection period of each angle sensor 2011). In the second execution thread, each second network control board 2012 reads the trim angle measurement values and the trim angle angular velocity measurement values for N times from $(T_0+\Delta T)$ in the interval ΔT. In the second execution thread, each first network control board 1012 and each second network control board 2012 read the measurement values synchronously measured by each water level sensor 1011 and each angle sensor 2011 from the corresponding register. Namely, the set of measurement values read at the collection time point $T_1$ is $[H_1, Y_3, Av_3]$, and the set of measurement values read at the collection time point $T_2$ is $[H_2, Y_6, Av_6]$. The measurement values are read for N times to obtain the real-time dynamic measurement data table $\lfloor(H_1, Y_3, Av_3), (H_2, Y_6, Av_6), \ldots, (H_\varphi, Y_t, Av_t)\rfloor$.

S5: pre-processing the measurement data; and

Firstly, performing offset correction on the water level measurement values measured by the water level measuring nodes 101 and 102 and the trim angle measurement values collected by the angle measuring nodes 201, 202, 203, 204, 205, and 206 based on the water level measurement offset values and the trim angle measurement offset values in the installation correction database 22 to obtain the water level correction values and the trim angle correction values.

Then, performing association and reforming on the water level correction values, the trim angle correction values, and the trim angle angular velocity measurement values by taking the collection time points as the index to generate the real-time dynamic measurement data table.

Extracting the water level correction values, the trim angle correction values, and the trim angle angular velocity measurement values in the complete trim motion period in the real-time dynamic measurement data table to form the trim motion period dynamic data table. Specifically, the collection time points in the complete trim motion period are tailored and the rest of the collection time points are abandoned according to rule of the change of the trim angle correction value with the collection time, and forming the trim motion period dynamic data table by the tailored data.

Finally, selecting and calculating the equilibrium state water level value and the equilibrium state trim angle value associated of the ship in the expected equilibrium state to form the expected equilibrium state measurement array.

S6: calculating the displacement volume of the ship.

The displacement volume of the ship is calculated according to the expected equilibrium state measurement array and the ship size data.

Specifically, the equilibrium state water height value of a first water level measuring node 101 on the port side of the stern and the equilibrium state water height value of a second water level measuring node 102 on the starboard side of the stern are arithmetically averaged to obtain the water level of the stern after the heeling correction, and then the draft of the stern after the heeling correction is calculated.

Then, the horizontal slice parallel to the bottom plane of the ship is made along the draft of the stern h at the water level. The draft of the stern h of the ship is used as the index, and the section areas of the heights of two adjacent equidistant slices $h_n$ and $h_{n+1}$ corresponding to the draft of the stern h of the ship, the maximum length of the stern of the ship in the slice sections, and the accumulated volume of the ship below the slice sections are retrieved in the ship size database 21. Then, the calculation module respectively calculates the section area of the slice section $S_h$ parallel to the bottom plane of the ship and taken along the draft position of the stern, the maximum length of the stern $L_h$ of the ship in the slice sections, and the accumulated volume $V_h$ of the ship below the slice section:

Then the volume of the trim wedge $\Delta V$ is calculated according to the section area of the slice section $S_h$ and the maximum length of the stern $L_h$ of the ship in the slice section.

Finally, the calculation module 26 calculates the displacement volume of the vertical arch wedge $V_{sag}$ of the ship based on the section area of the slice section parallel to the bottom plane at the draft of the stern h and the equilibrium state trim angle values of the angle measuring nodes 201, 202, 203, 204, 205, and 206 at the front portion, the middle portion, and the rear portion of the ship and the distances $L_f$ and $L_m$ between the projection of the installation centers of the angle measuring nodes on the middle longitudinal section of the ship. The weight of the ship is obtained by multiplying the water density with the gravitational acceleration of the location of the ship.

In the ship weighing method based on synchronous measurement of the water levels and the angles of the ship of the present disclosure, the water level measuring nodes 101 and 102 and the angle measuring nodes 201, 202, 203, 204, 205, and 206 are configured to synchronously collect the measurement values of the ship in the same state. Based on the equidistant slice data of the ship size data, the displacement volume of the ship is divided into the accumulated volume of the ship below the slice section corresponding to the draft of the stern of the ship, the volume of the trim wedge formed by trimming of the ship, and the volume of the vertical arch wedge formed after vertical arch deformation, which are respectively calculated and results thereof are combined to obtain the weight of the ship. Thus, calculation precision is further improved, and the actual weight of the ship is truly reflected.

What is claimed is:

1. A ship weighing system, comprising:
  a collection module, and
  a computing server communicated with the collection module;
  wherein the collection module is configured to synchronously collect and report water level measurement values of a plurality of positions on a ship, trim angle measurement values of the plurality of positions, and trim angle angular velocity measurement values of the plurality of positions; the computing server is configured to send a synchronization command and a data collection command to the collection module, receive and process data reported by the collection module, and calculate a displacement volume of the ship; the data at least comprises the water level measurement values of the plurality of positions on the ship, the trim angle measurement values of the plurality of positions, and the trim angle angular velocity measurement values of the plurality of positions;
  wherein a ship size database, an installation correction database, a clock synchronization module, a collection command module, a measurement data pre-processing module, and a calculation module are installed in the computing server;
  wherein the ship size database is configured to pre-store ship size data;
  wherein the installation correction database is configured to store measurement offset values generated by the collection module during an installing process;
  wherein the clock synchronization module is configured to send a synchronization command to perform time synchronization on the collection module;
  wherein the collection command module is configured to send a data collection command to the collection module according to an operation of a user; the data collection command comprises a collection start time point, an amount of the data collected, and a predetermined fixed interval value of collection time points of two adjacent data during a collection process;
  wherein the measurement data pre-processing module is configured to perform installation correction and integration of the data to generate a real-time dynamic measurement data table according to the water level measurement values, the trim angle measurement values, and the trim angle angular velocity measurement values reported by the collection module and the measurement offset values stored in the installation correction database; the measurement data pre-processing module is configured to complete data tailoring of a complete trim motion period according to change characteristics of the data of the real-time dynamic measurement data table over time; and the measurement data pre-processing module is further configured to calculate and generate an expected equilibrium state measurement array;
  wherein the calculation module is configured to calculate the displacement volume of the ship and obtain a weight of the ship according to the expected equilibrium state measurement array and the ship size data stored in the ship size database;
  wherein the collection module comprises two water level measuring nodes and angle measuring nodes; the two water level measuring nodes are respectively arranged on a port side of a stern of the ship and a starboard side of the stern; the two water level measuring nodes are symmetrically arranged with respect to a middle longitudinal section of the ship; the angle measuring nodes comprises two front angle measuring nodes, two middle angle measuring nodes, and two rear angle measuring nodes; the two front angle measuring nodes are respectively arranged on the port side of the ship and the starboard side of the ship and are corresponding to a front portion of the ship; the two middle angle measuring nodes are respectively arranged on the port side of the ship and the starboard side of the ship and are corresponding to a middle portion of the ship; the two rear angle measuring nodes are respectively arranged on the port side of the ship and the starboard side of the ship and are corresponding to a rear portion of the ship;

wherein each of the water level measuring nodes is configured to collect and report a height difference between each of the water level measuring nodes and a horizontal plane at a corresponding side of the stern according to the data collection command sent by the computing server; the angle measuring nodes are configured to collect and report a trim angle measurement value and a trim angle angular velocity measurement value of each of the angle measuring nodes at a corresponding installation position according to the data collection command sent by the computing server.

2. The ship weighing system according to claim 1, wherein the ship size data comprises a ship designed load draft value marked by a summer load line of the ship, distances between projections of installation centers of the angle measuring nodes on a middle longitudinal section of the ship, a distance between projections of installation centers of the two water level measuring nodes on the middle longitudinal section of the ship, and a data table; the date table comprises section areas of slice sections generated by making equidistant slices parallel to a bottom plane of the ship along a height direction of the ship from the bottom plane of the ship, a maximum length between a bow and the stern of the ship in each of the slice sections, and an accumulated volume of the ship below the slice sections.

3. The ship weighing system according to claim 2, wherein the calculation module is further configured to calculate a water level of the stern of the ship after a heeling correction according to water level values corresponding to the two water level measuring nodes in the expected equilibrium state measurement array;

wherein the calculation module is further configured to retrieve in the ship size database and calculate:
a draft of the stern of the ship after the heeling correction,
a section area of a slice section parallel to the bottom plane of the ship and taken along a draft position of the stern,
a maximum length of the stern of the ship in the slice section, and an accumulated volume of the ship below the slice section, and
a volume of a trim wedge;

wherein the trim wedge is formed between the slice section parallel to the bottom plane of the ship and an actual horizontal plane; the slice action is taken along the draft position of the stern; then the calculation module is configured to calculate to obtain the displacement volume of the ship without considering a correction on vertical arch deformation of the ship.

4. The ship weighing system according to claim 3, wherein the calculation module calculates the water level of the stern of the ship after the heeling correction by following formula:

$$H_e = \frac{H_{e101} + H_{e102}}{2}$$

wherein $H_e$ is the water level of the stern of the ship after the heeling correction; $H_{e101}$ and $H_{e102}$ are respectively the equilibrium state water level values in the expected equilibrium state measurement array corresponding to the water level measuring nodes arranged on the port side and the starboard of the stern of the ship;

wherein the calculation module calculates the draft of the stern of the ship after the heeling correction by follow formula:

$$h = H_{max} - H_e$$

h is the draft of the stern of the ship after the heeling correction; $H_{max}$ is the ship designed load draft value marked by a summer load line of the ship;

wherein the calculation module calculates the section area of the slice section parallel to the bottom plane of the ship and taken along the draft position of the stern, the maximum length of the stern of the ship in the slice section, and the accumulated volume of the ship below the slice section by following formulas:

$$S_h = S_n + \frac{S_{n+1} - S_n}{h_{n+1} - h_n} \times (h - h_n);$$

$$L_h = L_n + \frac{L_{n+1} - L_n}{h_{n+1} - h_n} \times (h - h_n);$$

$$V_h = V_n + \frac{V_{n+1} - V_n}{h_{n+1} - h_n} \times (h - h_n);$$

wherein $S_h$, $L_h$, and $V_h$ are respectively the section area of the slice section parallel to the bottom plane of the ship and taken along the draft position of the stern, the maximum length of the stern of the ship in the slice section, and the accumulated volume of the ship below the slice section;

$h_n$ and $h_{n+1}$ are heights of two adjacent equidistant slices corresponding to the draft h of the stern of the ship after the heeling correction in the ship size database; and $h_n \leq h < h_{n+1}$;

$S_n$, $L_n$, and $V_n$ are respectively a section area of a slice section corresponding to $h_n$ in the ship size database, the maximum length of the stern in the slice section corresponding to $h_n$, and an accumulated volume of the ship below the slice section corresponding to $h_n$;

$S_{n+1}$, $L_{n+1}$, and $V_{n+1}$ are respectively a section area of a slice section corresponding to $h_{n+1}$ in the ship size database, the maximum length of the stern in the slice section corresponding to $h_{n+1}$, and an accumulated volume of the ship below the slice section corresponding to $h_{n+1}$;

wherein the calculation module calculates the volume of the trim wedge by following formula:

$$\Delta V = \frac{1}{2} \times S_h \times L_h \times \tan(Ye_0);$$

wherein $\Delta V$ is the volume of the trim wedge; $Ye_0$ is a trim angle value of the ship;

wherein the calculation module calculates the displacement volume of the ship without considering the correction on the vertical arch deformation of the ship by following formula:

$$V_{e0} = V_h - \Delta V.$$

5. The ship weighing system according to claim 4, wherein the calculation module is further configured to perform vertical arch correction on a volume of a vertical arch wedge formed by the vertical arch deformation in the middle portion of the ship, and calculate the displacement volume of the ship after the correction on the vertical arch deformation;

wherein the calculation module calculates the volume of the vertical arch wedge by following formula:

$$V_{sag} = \frac{1}{2} \times S_h \times H_{sag};$$

$V_{sag}$ is the volume of the vertical arch wedge formed by the vertical arch deformation in the sag middle portion of the ship; $H_{sag}$ is a height of the vertical arch wedge; $S_h$ is the section area of the slice section parallel to the bottom plane of the ship and taken along the draft position of the stern;

wherein the height of the vertical arch wedge $H_{sag}$ is calculated by following formula:

$$H_{sag} = \frac{1}{4}[L_{f1} \times \tan(Ye_{201} - Ye_{202}) + L_{f2} \times \tan(Ye_{204} - Ye_{205}) + L_{m1} \times \tan(Ye_{202} - Ye_{203}) + L_{m2} \times \tan(Ye_{205} - Ye_{206})];$$

$L_{f1}$ is a distances between a projection of an installation center of a first front angle measuring node arranged on the port side of the ship on the middle longitudinal section of the ship and a projection of an installation center of a corresponding middle angle measuring node on the middle longitudinal section of the ship; $L_{f2}$ is a distances between a projection of an installation center of a second front angle measuring node arranged on the starboard side of the ship on the middle longitudinal section of the ship and a projection of an installation center of a corresponding middle angle measuring node on the middle longitudinal section of the ship; $L_{m1}$ is a distances between a projection of an installation center of a first middle angle measuring node arranged on the port side of the ship on the middle longitudinal section of the ship and a projection of an installation center of a corresponding rear angle measuring node on the middle longitudinal section of the ship; $L_{m2}$ is a distances between a projection of an installation center of a second middle angle measuring node arranged on the starboard side of the ship on the middle longitudinal section of the ship and a projection of an installation center of a corresponding rear angle measuring node on the middle longitudinal section of the ship; $Ye_{201}$, $Ye_{202}$, $Ye_{203}$ are respectively an equilibrium state trim angle value of a front portion of the port side of the ship, an equilibrium state trim angle value of a middle portion of the port side of the ship, and an equilibrium state trim angle value of a rear portion of the port side of the ship; $Ye_{204}$, $Ye_{205}$, and $Ye_{206}$ are respectively an equilibrium state trim angle value of a front portion of the starboard side of the ship, an equilibrium state trim angle value of a middle portion of the starboard side of the ship, and an equilibrium state trim angle value of a rear portion of the starboard side of the ship;

wherein the calculation module calculates the displacement volume of the ship after the correction on the vertical arch deformation by following formula:

$$V_e = V_{e0} + V_{sag};$$

wherein $V_e$ is the displacement volume of the ship.

6. The ship weighing system according to claim 1, wherein the measurement offset values comprise:
a vertical height difference between a measurement zero scale measured by each of the water level measuring nodes after the water level measuring nodes are installed and a summer load line of the ship, and
an offset difference between an initial trim angle measurement value measured by each of the angle measuring nodes and an actual value of an installation trim angle of each of the angle measuring nodes after the angle measuring nodes are installed;

wherein the actual value of the installation trim angle of each of the angle measuring nodes is calculated by following formulas:

$$Y_m = \arctan\lfloor(h_a - h_f)/(L_f + L_m)\rfloor;$$

$$Y_f = \arctan\lfloor(h_m - h_f)/L_f\rfloor;$$

$$Y_a = \arctan\lfloor(h_a - h_m)/L_m\rfloor;$$

wherein $Y_f$, $Y_m$, $Y_a$ are respectively an actual value of an installation trim angle of each of the front angle measuring nodes, an actual value of an installation trim angle of each of the middle angle measuring nodes, and an actual value of an installation trim angle of each of the rear angle measuring nodes; $h_f$ is a draft reading obtained by visual reading of an actual front draft mark of the ship or $h_f$ is the draft reading obtained by measuring the actual front draft mark of the ship via an electronic measuring tool; $h_m$ is a draft reading obtained by visual reading of an actual middle draft mark of the ship or $h_m$ is a draft reading obtained by measuring the actual middle draft mark of the ship via the electronic measuring tool; $h_a$ is a draft reading obtained by visual reading of an actual rear draft mark of the ship or $h_a$ is a draft reading obtained by measuring the actual rear draft mark of the ship via the electronic measuring tool; $L_m$ is a distances between a projection of an installation center of each of the rear angle measuring nodes on the middle longitudinal section of the ship and a projection of an installation center of a corresponding middle angle measuring node on the middle longitudinal section of the ship; each of the rear angle measuring nodes is arranged on the port side of the ship or the starboard side of the ship; $L_f$ is a distances between a projection of an installation center of each of the front angle measuring nodes on the middle longitudinal section of the ship and a projection of an installation center of a corresponding middle angle measuring node on the middle longitudinal section of the ship; each of the front angle measuring nodes is arranged on the port side of the ship or the starboard side of the ship.

7. The ship weighing system according to claim 6, wherein the measurement data pre-processing module comprises a data integration unit, a data tailoring unit, and an expected equilibrium state array generation unit;

wherein the data integration unit is configured to receive the water level measurement values, the trim angle measurement values, and the trim angle angular velocity measurement values reported by the collection module; and the data integration unit is configured to perform offset correction on the water level measurement values and the trim angle measurement values based on the measurement offset values stored in the installation correction database to obtain water level correction values and trim angle correction values; the data integration unit is further configured to perform association and reforming on the water level correction values, the trim angle correction values, and the trim angle angular velocity measurement values by taking each of the collection time points corresponding to each data as an index to generate the real-time dynamic measurement data table;

wherein the data tailoring unit is configured to tailor the data in the real-time dynamic measurement data table to generate a trim motion period dynamic data table;

wherein the expected equilibrium state array generation unit is configured to calculate an equilibrium state water level value and an equilibrium state trim angle value associated with a motion balance time point of the ship in a trim motion period, according to the data in the trim motion period dynamic data table, to form the expected equilibrium state measurement array.

8. The ship weighing system according to claim 7, wherein the data tailoring unit is further configured to select collection time points corresponding to two maximum values or two minimum values as the trim motion period according to a change trend of any type of the data of an arithmetic average value of two water level correction values corresponding to the port side and the starboard side of the stern, the trim angle correction values, and the trim angle angular velocity measurement values in the real-time dynamic measurement data table in a current collection period; the water level correction values, the trim angle correction values, and the trim angle angular velocity measurement values associated with the collection time points during the trim motion period constitute the trim motion period dynamic data table.

9. The ship weighing system according to claim 8, wherein the expected equilibrium state array generation unit is further configured to calculate an arithmetic average value or a median value of all of the water level correction values in the trim motion period dynamic data table and is configured to calculate an arithmetic average value or a median value of all of the trim angle correction values in the trim motion period dynamic data table; and the arithmetic average value or the median value of the water level correction values is regarded as the equilibrium state water level value; the arithmetic average value or the median value of the trim angle correction values is regarded as the equilibrium state trim angle value; the equilibrium state water level value and the equilibrium state trim angle value form the expected equilibrium state measurement array.

10. The ship weighing system according to claim 8, wherein the expected equilibrium state array generation unit is further configured to retrieve a collection time point associated with a trim angle angular velocity measurement value having a maximum absolute value in the trim motion period dynamic data table; a water level correction value and a trim angle correction value corresponding to the associated collection time point are respectively regarded as the equilibrium state water level value and the equilibrium state trim angle value; the equilibrium state water level value and the equilibrium state trim angle value form the expected equilibrium state measurement array.

11. The ship weighing system according to claim 1, wherein the ship weighing system further comprises a network switch, a wireless router, and a display control terminal;

wherein the network switch is communicated with the collection module, the computing server, the wireless router, and the display control terminal via Ethernet lines; the network switch is configured to realize communication among the collection module, the computing server, the wireless router, and the display control terminal;

wherein the wireless router is configured to access an external Internet and transmit the displacement volume of the ship to a cloud server;

wherein the display control terminal is configured to recognize the operation of the user, realize human-machine interaction, and recognize a reported command and parameter configuration sent by the cloud server.

12. A ship weighing method based on synchronous measurement of water levels and angles of a ship, executed by the ship weighing system according to claim 1, comprising:

S1: establishing the ship size database and pre-storing the ship size data in the ship size database;

S2: establishing the installation correction database and storing measurement offset values generated by the collection module during the installation process;

S3: synchronizing the computing server with the collection module through network standard time or GPS standard time;

S4: synchronously collecting and obtaining the water level measurement values the trim angle measurement values, and trim angle angular velocity measurement values according to the collection start time point, the amount of collection data, and the predetermined fixed interval value of the collection time points of two adjacent collection data during the collection process;

S5: pre-processing the measurement data: offsetting and correcting the water level measurement values and the trim angle measurement values to obtain water level correction values and trim angle correction values and performing the integration on data to generate a real-time dynamic measurement data table according to the measurement offset values stored in the installation correction database; tailoring and restructuring water level correction values and trim angle correction values in a complete trim motion period of the real-time dynamic measurement data table to generate a trim motion period dynamic data table; and selecting or calculating equilibrium state water level values and equilibrium state trim angle values to generate the expected equilibrium state measurement array according to a trim motion period dynamic data table; and S6: calculating the displacement volume: calculating the displacement volume of the ship according to the expected equilibrium state measurement array and the ship size data, and obtaining the Wight of the ship by multiplying a water density with a gravitational acceleration.

* * * * *